US008934486B2

(12) United States Patent
Wijnands et al.

(10) Patent No.: US 8,934,486 B2
(45) Date of Patent: Jan. 13, 2015

(54) SYSTEM AND METHOD FOR IMPLEMENTING MULTICAST OVER A LABEL-SWITCHED CORE NETWORK

(75) Inventors: Ijsbrand Wijnands, Leuven (BE); Arjen Boers, Sitges (ES); Alton Lo, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1570 days.

(21) Appl. No.: 11/377,064

(22) Filed: Mar. 16, 2006

(65) Prior Publication Data

US 2007/0217415 A1    Sep. 20, 2007

(51) Int. Cl.
*H04L 12/28* (2006.01)
*H04L 12/56* (2006.01)
*H04J 3/26* (2006.01)
*H04L 12/701* (2013.01)
*H04L 12/18* (2006.01)
*H04L 12/46* (2006.01)
*H04L 12/761* (2013.01)
*H04L 12/723* (2013.01)
*H04L 12/931* (2013.01)
*H04L 12/66* (2006.01)

(52) U.S. Cl.
CPC ............ *H04L 45/00* (2013.01); *H04L 12/1836* (2013.01); *H04L 12/4633* (2013.01); *H04L 45/16* (2013.01); *H04L 45/50* (2013.01); *H04L 12/18* (2013.01); *H04L 12/185* (2013.01); *H04L 49/201* (2013.01); *H04L 12/66* (2013.01)
USPC ............................ 370/390; 370/401; 370/432

(58) Field of Classification Search
CPC ....... H04L 12/18; H04L 12/185; H04L 45/16; H04L 49/201; H04L 12/66

USPC .......................................... 370/390, 401, 432
See application file for complete search history.

(56) References Cited

U.S. PATENT DOCUMENTS

| | | | |
|---|---|---|---|
| 6,192,051 B1 | 2/2001 | Lipman et al. | 370/389 |
| 6,466,985 B1 | 10/2002 | Goyal et al. | 709/238 |
| 6,553,028 B1 | 4/2003 | Tang et al. | 370/389 |
| 6,680,943 B1 | 1/2004 | Gibson et al. | 370/392 |

(Continued)

OTHER PUBLICATIONS

Alton Lo, Arjen Boers, Ijsbrand Wijnands; "Transporting Multicast Over MPLS Backbone Using Virtual Interfaces to Perform Reverse-Path Forwarding Checks;" U.S. Appl. No. 11/204,446, filed Aug. 16, 2005.

(Continued)

*Primary Examiner* — Hassan Phillips
*Assistant Examiner* — Lonnie Sweet
(74) *Attorney, Agent, or Firm* — Campbell Stephenson LLP

(57) ABSTRACT

Various devices and methods for implementing multicast over a label-switched core network are disclosed. For example, an edge node can include a physical interface, which is not enabled for multicast, that is configured to be coupled to a core network and a packet rewrite module coupled to the physical interface. The packet rewrite module is configured to encapsulate a multicast packet with a label and to send the encapsulated multicast packet to the physical interface. The label identifies a unicast label switched path (LSP) through the core network. The edge node can also include a virtual interface creation configured to create a virtual interface that is enabled for multicast. The packet rewrite module can encapsulate the multicast packet in response to detecting that the multicast packet is being sent via the virtual interface.

19 Claims, 6 Drawing Sheets

(56) References Cited

U.S. PATENT DOCUMENTS

| | | | |
|---|---|---|---|
| 6,711,163 B1 * | 3/2004 | Reid et al. | 370/390 |
| 6,728,777 B1 | 4/2004 | Lee et al. | 709/238 |
| 6,839,348 B2 | 1/2005 | Tang et al. | 370/390 |
| 6,880,090 B1 | 4/2005 | Shawcross | 726/14 |
| 6,937,574 B1 * | 8/2005 | Delaney et al. | 370/254 |
| 6,947,428 B1 | 9/2005 | Andersson et al. | 370/395.5 |
| 7,061,921 B1 | 6/2006 | Sheth | 370/395.52 |
| 7,260,097 B2 * | 8/2007 | Casey | 370/392 |
| 7,281,058 B1 * | 10/2007 | Shepherd et al. | 709/238 |
| 7,339,903 B2 * | 3/2008 | O'Neill | 370/313 |
| 7,522,600 B1 | 4/2009 | Aggarwal et al. | 370/390 |
| 7,529,199 B1 | 5/2009 | Wijnands et al. | 370/256 |
| 7,720,994 B2 | 5/2010 | Li | 709/238 |
| 7,966,414 B2 | 6/2011 | Cinghita et al. | 709/231 |
| 2002/0067725 A1 | 6/2002 | Oguchi et al. | 370/390 |
| 2002/0150094 A1 | 10/2002 | Cheng et al. | 370/389 |
| 2002/0186658 A1 | 12/2002 | Chiu et al. | 370/237 |
| 2003/0165140 A1 | 9/2003 | Tang et al. | 370/393 |
| 2003/0200336 A1 | 10/2003 | Pal et al. | 709/246 |
| 2003/0223372 A1 | 12/2003 | Sanchez et al. | 370/237 |
| 2003/0223402 A1 | 12/2003 | Sanchez et al. | 370/351 |
| 2004/0218536 A1 | 11/2004 | Yasukawa et al. | 370/254 |
| 2006/0007931 A1 * | 1/2006 | Wright et al. | 370/392 |
| 2006/0018333 A1 | 1/2006 | Windisch et al. | 370/432 |
| 2006/0062218 A1 * | 3/2006 | Sasagawa | 370/389 |
| 2006/0088031 A1 | 4/2006 | Nalawade | 370/390 |
| 2006/0120368 A1 | 6/2006 | Aboukarr et al. | 370/390 |
| 2006/0147204 A1 * | 7/2006 | Yasukawa et al. | 398/26 |
| 2006/0159009 A1 * | 7/2006 | Kim et al. | 370/216 |
| 2006/0221975 A1 * | 10/2006 | Lo et al. | 370/395.5 |
| 2007/0058646 A1 * | 3/2007 | Hermoni | 370/401 |
| 2007/0110062 A1 * | 5/2007 | Balay et al. | 370/390 |
| 2007/0195778 A1 * | 8/2007 | Tatar et al. | 370/392 |
| 2007/0217415 A1 | 9/2007 | Wijnands et al. | 370/370 |
| 2008/0298365 A1 | 12/2008 | Mitumori | 370/390 |

OTHER PUBLICATIONS

J. De Clercq, et al.; "Connecting IPv6 Islands Across IPv4 Clouds with BGP;" available via the Internet at http://www3.ietf.org/proceedings/02mar/I-D/draft-ietf-ngtrans-bgp-tunnel-04.txt; Jan. 2002; pp. 1-12.

Morten J. Christensen; "Multicast MPLS and Ethernet;" *The MPLS WG Archive*; available via the Internet at http://cell-relay.indiana.edu/mhonarc/mpls/2001-Oct/msg00001.html; Oct. 1, 2001; pp. 1-4.

Cao, et al.; "Multicast in MPLS/BGP IPv6 VPNs;" available via the Internet at http://tools.ietforg/wg/ipv6/draft-cao-mcast-for-ipv6-ppvpn-00.txt; Feb. 24, 2006; pp. 1-11.

Internetworking Technologies Handbook—Fourth Edition, Cisco Systems, Inc., Chapter 32, "MPLS", Copyright © 2004 Cisco Systems, Inc., pp. 523-538.

Internetworking Technologies Handbook—Fourth Edition, Cisco Systems, Inc., Chapter 45, "Internet Protocol Multicast", Copyright © 2004 Cisco Systems, Inc., pp. 699-718.

* cited by examiner

US 8,934,486 B2

SYSTEM AND METHOD FOR IMPLEMENTING MULTICAST OVER A LABEL-SWITCHED CORE NETWORK

FIELD OF THE INVENTION

This invention relates to networking and, more particularly, to conveying multicast traffic in a network.

DESCRIPTION OF THE RELATED ART

As a business grows, so can its network, increasing in the number of network elements coupled to the network, the number of network links, and also geographic diversity. Over time, a business' network can include physical locations scattered throughout a city, a state, a country, or the world. Since it can be prohibitively expensive to create a private network that spans these great distances, many businesses opt to rely upon a third-party provider's network to provide connectivity between the disparate geographic sites of the business. In order for the business' network to seamlessly function through the provider network, the business must be able to use the provider network to transmit all the business' various types of data streams, including multicast.

Multicast routing protocols enable multicast transmission (i.e., one-to-many and many-to-many transmission) by replicating a multicast packet close to the destination of that packet, obviating the need for multiple unicast connections for the same purpose; thus, saving network bandwidth and improving throughput. Upon receiving a multicast packet, a network node can examine the multicast group destination address of the packet and determine whether one or more downstream subscribers to the multicast packet (i.e., members of the multicast group) are connected to the network node (either directly or indirectly). The network node can then replicate the multicast packet as needed and transmit the replicated packets to any connected subscribers.

The path over which a business' multicast data stream should flow may include an intervening third-party provider network. In some situations, the third-party provider network is not configured to participate in the multicast protocol (e.g., Protocol Independent Multicast (PIM)) that the business' network nodes use to establish multicast distribution trees. For example, while the business may have upgraded to Internet Protocol version 6 (IPV6), the provider's devices may still be using IP version 4 (IPV4). In such a situation, the multicast protocol used by the business cannot be implemented across the provider network without modifying the provider network. Accordingly, techniques are desirable to allow multicast protocols to be implemented over provider networks without modifying the core of the provider network.

BRIEF DESCRIPTION OF THE DRAWINGS

A more complete understanding of the present invention may be acquired by referring to the following description and the accompanying drawings, in which like reference numbers indicate like features.

Figure 1:
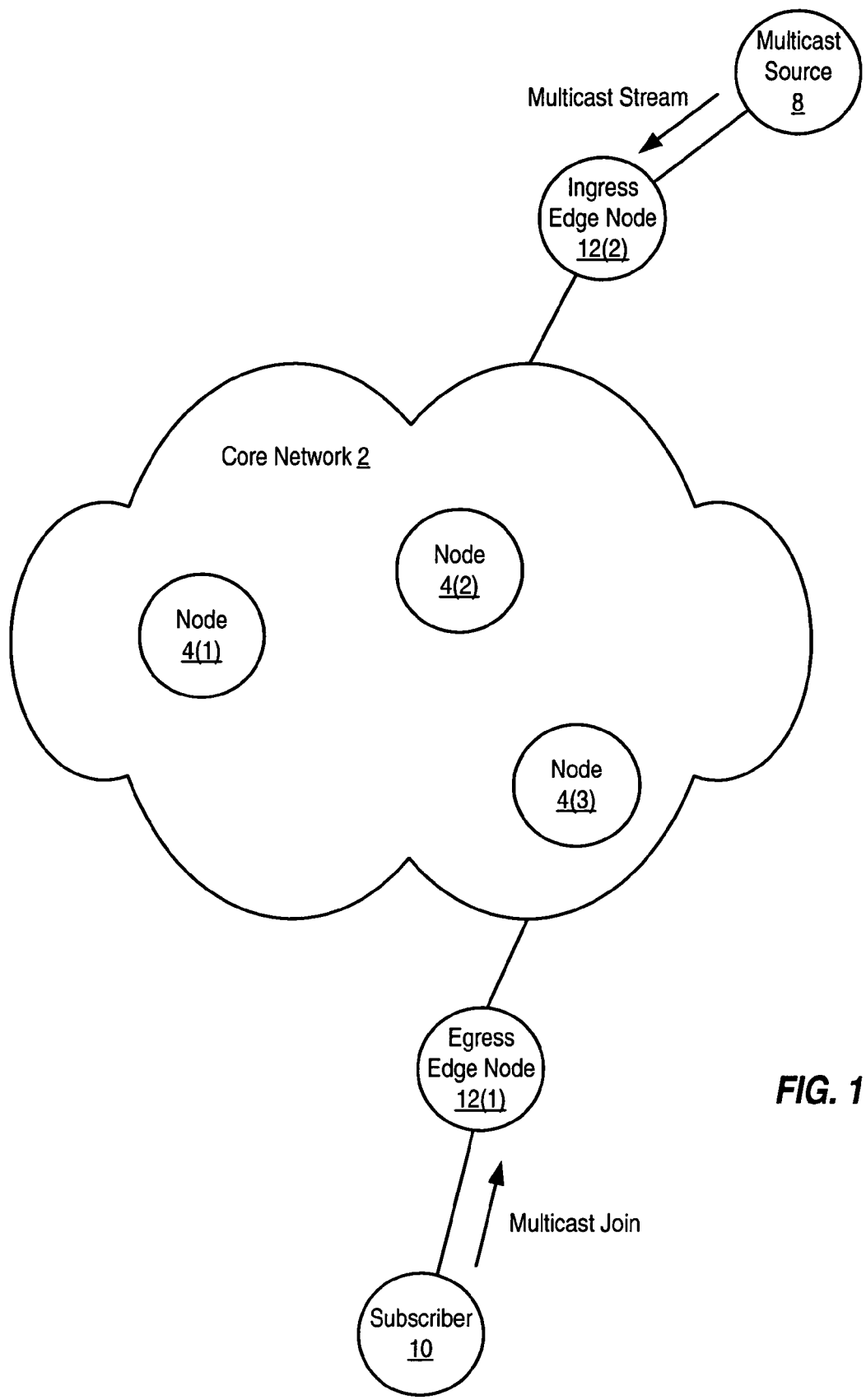
FIG. 1 is a block diagram of a network that includes multicast-enabled devices coupled by a non-multicast-enabled label-switched core network, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a network that includes multicast-enabled devices coupled by a non-multicast-enabled label-switched core network. As shown, egress edge node 12(1) is coupled to ingress edge node 12(2) by core network 2, which includes nodes 4(1)-4(3). Ingress edge node 12(2) is coupled to multicast source 8, while egress edge node 12(1) is coupled to multicast subscriber 10.

In multicast routing, a multicast source, such as multicast source 8, sends a multicast data stream to a group of subscribers represented by a multicast group address G. A network node that is processing a packet addressed to the multicast group must determine which direction is upstream (toward the source of the multicast data stream addressed to the multicast group) and which direction or directions are downstream (toward the subscribers to the multicast group). If there are multiple downstream paths, the network node will replicate the packet and forward the packet down the appropriate downstream paths.

As noted above, multicast source 8 is configured to provide a multicast stream (a stream of one or more packets addressed to a particular multicast group) to subscribers to the multicast group. Multicast source 8 is a computing device (e.g., a host computer system, personal digital assistant, cell phone, network appliance, network device, or the like) that encodes a data stream for transmission and then sends packets containing the encoded data stream to subscribers. For example, multicast source 8 can be a video head end that receives a video stream, prepares that video stream for transmission, and sends packets that encode the video stream to subscribers. While FIG. 1 illustrates a single multicast source, it is noted that other embodiments can include multiple multicast sources that provide the same and/or different streams of data to the same and/or different multicast addresses. Additionally, a single multicast source can source several different streams of data to the same and/or different multicast addresses.

Multicast subscriber 10 is a node that subscribes to a multicast group G. Subscribers, such as subscriber 10, send multicast join messages towards the multicast source in order to be added to the multicast group. The multicast stream is forwarded to each subscriber currently in the multicast group.

Subscriber 10 can join a multicast group in response to receiving a request for a particular multicast stream from a host (not shown). For example, the subscriber 10 can generate a multicast join message in response to receiving an Internet Group Management Protocol (IGMP) report identifying the multicast group from a host.

Once multicast subscriber 10 has joined multicast group G, multicast subscriber 10 receives a data stream addressed to multicast group G via network 2 and provides the data stream to interested host(s), which in turn decode the data stream and present the decoded data stream to users (e.g., via a display device such as a monitor and/or an audio device such as a speaker). Such hosts can be personal computers, personal digital assistants, cell phones, network appliances, set top boxes, and the like.

In general, ingress edge node 12(2), egress edge node 12(1), and subscriber 10 can include various network devices (e.g., routers and/or switches) that perform routing functions and support a routing protocol. Each such network device maintains one or more routing tables that stores routing information identifying routes to various data sources and/or data consumers. Each network device implements a multicast routing protocol that is used to convey multicast data packets from multicast source 8 to multicast subscriber 10. For each multicast group to which multicast source sends data, the multicast routing protocol can establish a multicast tree (also referred to as a multicast distribution tree), which is a group of coupled nodes that can convey a multicast data stream from the multicast source to the multicast subscribers.

An edge node is a node that has one or more network interfaces connected to other nodes (e.g., nodes 4(1)-4(3)) within a label switched network and one or more other network interfaces connected to non-label-switched-routing devices (e.g., subscriber 10 or multicast source 8). Edge nodes encapsulate packets being sent into the core network with appropriate labels and remove labels from packets being sent out of the core network. Edge nodes provide access to core network 2, which can contain data transmission lines, network elements (e.g., routers, switches, and the like), and Open System Interconnection (OSI) Level 2 network devices to aid in the transmission of data from one edge router to another edge router via the core network. In one embodiment, ingress edge node 12(2) and egress edge node 12(1) are customer edge nodes provider edge nodes (edge nodes within a provider network).

Core network 2 contains, as an example, nodes 4(1)-4(3), which are coupled in a manner to permit transmission of packets through the core network. Core network 2 is not limited to the illustrated configuration, and can include any number of network elements, transmission lines, and other layer 2 (L2) and layer 3 (L3) network devices.

Core network 2 is a label switched network that implements a label switched routing protocol such as Multiprotocol Label Switching (MPLS). In an MPLS network, incoming packets are assigned a label by an edge node (e.g., egress edge node 12(1) or ingress edge node 12(2)). The label takes the form of a header that is created by the edge node and used by nodes within the label switched network when forwarding packets. A node that is configured to perform label switched routing will create and maintain a label forwarding information base (LFIB) that indicates where and how to forward packets with specific label values. The non-edge nodes 4(1)-4(3) within the label switched network are referred to as core nodes, and switch labeled packets based on the label value in the label header. All interfaces of a core node are connected to other nodes that perform label switched routing (either core or edge nodes).

The path through core network 2 that is defined by the labels is called a label switched path (LSP). Label information is distributed among the core nodes through the use of a label distribution protocol (LDP). Packets are forwarded within the core network along the label switch path. Each node that handles a given packet makes forwarding decisions based solely on the contents of the label attached to that packet. At each hop, a node may strip off the existing label and apply a new label which tells the next hop how to forward the packet. While the nodes within core network 2 are capable of performing label switched routing, the core nodes are not configured to support multicast protocols or point-to-multipoint LSPs (e.g., the core nodes cannot support multicast or the core nodes are not enabled to perform multicast).

Egress edge node 12(1) and ingress edge node 12(2) are enabled to participate in a multicast protocol, such as Protocol Independent Multicast (PIM) (as used herein, PIM describes any of a variety of different PIM protocols, including source specific multicast (SSM), sparse mode (SM), dense mode (DM), and bidirectional (BIDIR)). In contrast, nodes 4(1)-4(3) are not enabled for multicast. Accordingly, within each edge node, the physical interface that is coupled to core network 2 will not be enabled for multicast. As a result, edge nodes 12(1) and 12(2) cannot send multicast protocol messages into core network 2.

Additionally, edge nodes 12(1) and 12(2) may be configured to use a different addressing scheme than the nodes in core network 2. For example, edge nodes 12(1) and 12(2) may be configured to use Internet Protocol version 6 (IPV6) addresses, while nodes 4(1)-4(3) in core network 2 are configured to use Internet Protocol version 4 (IPV4) addresses. Thus, the interfaces in edge nodes 12(1) and 12(2) that are coupled to core network 2 are not enabled for the same addressing scheme as other interfaces in edge nodes 12(1) and 12(2).

In order to exchange multicast protocol messages via core network 2, the edge nodes are configured to implement "virtual" (i.e., logical or non-physical) interfaces that are enabled for multicast. These virtual interfaces are also enabled for the appropriate addressing scheme in use by the edge nodes. The multicast protocol will send and receive multicast protocol messages via these virtual interfaces within the edge nodes. Since the virtual interfaces are enabled appropriately for multicast, the multicast protocol will not behave significantly differently than it would if a network that was enabled for multicast coupled the edge nodes.

Functionality (e.g., software executing on a route processor) within the edge nodes will intercept each packet (e.g., such as a multicast protocol message) being output via a virtual interface and rewrite that packet (e.g., by attaching an appropriate label) for transmission via core network 2. The rewritten packets will then be output from a physical interface that is coupled to core network 2. As noted above, the actual physical interface from which the rewritten packets are output may be enabled for neither multicast nor the same addressing scheme as the virtual interface.

The message-intercepting functionality within each edge node can rewrite packets being output via the virtual interface by encapsulating the packets with a label identifying the appropriate label switched path (which is a unicast, or point-to-point, route between egress node 12(1) and ingress node 12(2)) within core network 2. Accordingly, multicast protocol messages will be exchanged via the edge nodes using unicast label switched paths.

When the network of FIG. 1 initially begins operation, no virtual interfaces are established. When an edge node, such as egress edge node 12(1), receives a multicast join message from a multicast subscriber, the edge node will look up the next hop node to which the multicast join message should be forwarded. If the next hop node is only reachable via a network that is not enabled for multicast and/or that does not support the same addressing scheme being used to convey the join message, the edge node will create a virtual interface. For example, if egress edge node 12(1) identifies that the next hop node, ingress edge node 12(2), has an IPV4-mapped IPV6 address (indicating that the next hop node is only reachable via an IPV4 network) and if the physical interface leading to that next hop node is not enabled for multicast, egress edge node 12(1) will create a virtual interface that is enabled for multicast and IPV6.

When an edge node (such as ingress edge node 12(2)) receives a packet from core network 2, the edge node removes the label and processes the packet. If the packet is a multicast protocol message and the incoming interface that received the packet is not enabled for multicast, the edge node will create a virtual interface, which is enabled for multicast, and rewrite the packet header to indicate that the packet was received via the virtual interface.

Once multicast-enabled virtual interfaces have been created in both ingress edge node 12(2) and egress edge node 12(1), the two edge nodes can exchange multicast protocol messages, such as PIM join messages, prune messages, and hello messages, via the multicast-enabled virtual interfaces. In particular, once egress edge node 12(1) has created a multicast-enabled virtual interface, the egress edge node will begin sending multicast protocol hello messages via that virtual interface. Message-intercepting functionality within the edge node intercepts the hello messages and attaches a label identifying the LSP useable to reach ingress edge node 12(2). In response to receiving the hello message via a non-multicast enabled interface, ingress edge node 12(2) can create an appropriate virtual interface and begin sending hello messages to egress edge node 12(1) via the newly-created virtual interface. Once the nodes have established a relationship with each other by exchanging hello messages, the downstream edge node can forward a join message towards the upstream edge node, causing a multicast tree that includes both edge nodes to be established.

When an edge node (such as ingress edge node 12(2)) coupled to a multicast source receives a multicast data stream for transmission to a subscriber via core network 2, the edge node will send the multicast data stream to the subscriber via the appropriate virtual interface(s) (e.g., a virtual interface can be defined for each outgoing interface from which the multicast data stream should be output). Individual packets sent via the virtual interface(s) are intercepted and encapsulated for transmission via a unicast label-switched path through core network 2. As a result, no multicast-type replication will be performed within core network 2; instead, any needed replication is performed at the edge nodes 12(1) and/or 12(2).

Figure 2:
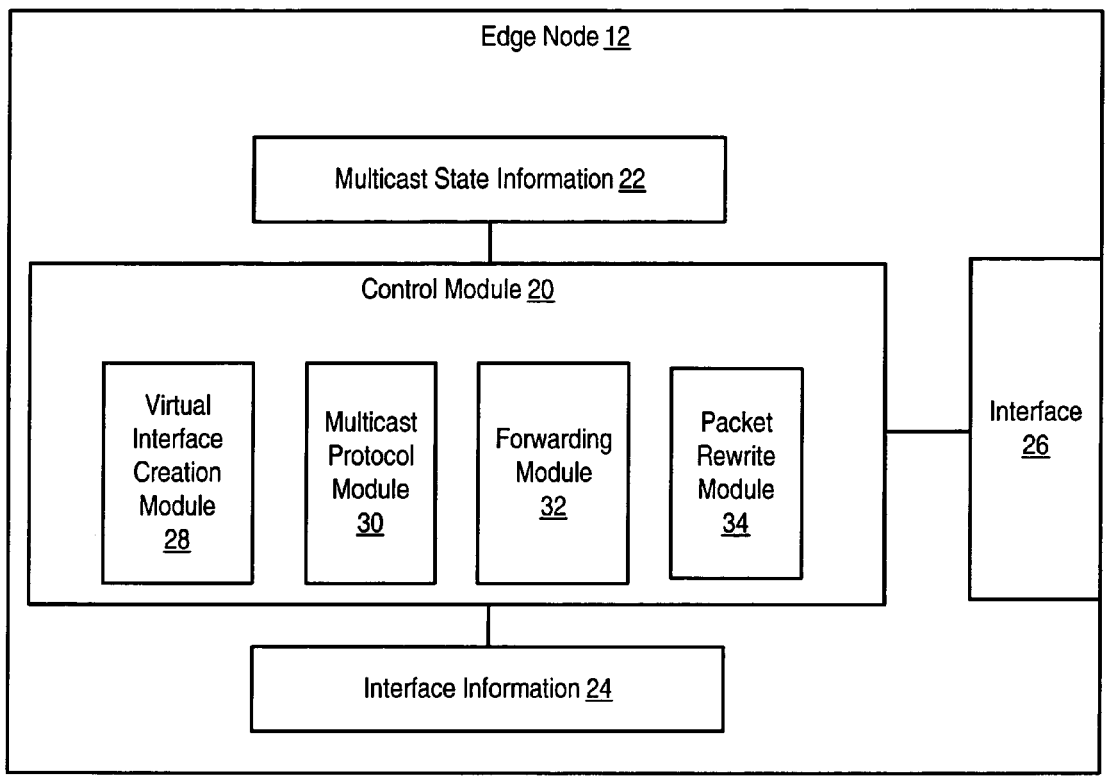
FIG. 2 is a block diagram of a network device that is configured to send and/or receive multicast protocol messages via a non-multicast-enabled label-switched core network, according to one embodiment of the present invention.

FIG. 2 is a block diagram of a network device that is configured to send and/or receive multicast protocol messages via a non-multicast-enabled label-switched core network. Edge node 12 is an edge network device (e.g., one of edge nodes 12(1) or 12(2) of FIG. 1) that is configured to exchange multicast protocol messages via a core network that is not multicast-enabled and that may also not be enabled to use the same addressing protocol as edge node 12. Edge node 12 is enabled to perform multicast routing and forwarding.

Edge node 12 includes control module 20, multicast state information 22, interface information 24, and one or more physical interfaces such as interface 26. Control module 20 can implement a forwarding engine and/or routing module.

Control module 20 includes virtual interface creation module 28, multicast protocol module 30, forwarding module 32, and packet rewrite module 34.

Each interface, both physical and virtual, implemented within edge node 12 can be represented by a data structure within interface information 24. A data structure representing a physical interface will include information identifying the actual physical interface; a data structure representing a virtual interface will not identify a physical interface. Interface 26 is an example of a physical interface that is configured to send and receive packets. Interface 26 can be coupled to a core node within a label switched network. In one embodiment, interface 26 is not enabled for multicast or IPV6.

Virtual interface creation module 28 is configured to create virtual interfaces for each other edge node with which edge node 12 exchanges multicast protocol messages. Virtual interface creation module 28 can create a virtual interface either in response to receiving a multicast protocol message from another node via a non-multicast-enabled core network or in response detecting that the next hop node to which a multicast protocol message should be forwarded is only reachable via a non-multicast-enabled core network. In an egress edge node, each virtual interface corresponds to an ingress edge node as well as to a reverse path forwarding (RPF) neighbor. In an ingress edge node, each virtual interface corresponds to an egress edge node.

Virtual interface creation module 28 creates a virtual interface by updating interface information 24 to include information identifying the new virtual interface. This information includes the address of the virtual interface as well as the functionality (e.g., multicast) for which the virtual interface is enabled. As noted above, the data structure in interface information 24 that is associated with the virtual interface does not identify a physical interface within edge node 12, since the interface being created is a virtual interface.

In some embodiments, the address of the virtual interface is a loopback address associated with edge node 12. A loopback address has no associated hardware and is not physically connected to a network. Loopback addresses are often used to test IP software independently of underlying hardware problems or constraints.

It is noted that virtual interface creation module 28 can create a different virtual interface for different upstream or downstream nodes. For example, if edge node 12 is a downstream node (e.g., such as egress edge node 12(1) of FIG. 1), edge node can subscribe to multiple different multicast groups that each have different source nodes, which are each reachable via a different upstream edge node. For each of these multicast groups, interface creation module 28 within an egress edge node can create a respective virtual interface. Packets sent via the different virtual interfaces can be routed via respective unicast LSPs. Similarly, if edge node 12 is an upstream node (e.g., such as ingress edge node 12(2) of FIG. 1), several different egress edge nodes can subscribe to a multicast data stream that is conveyed via edge node 12. Edge node 12 can create a different virtual interface for each different downstream edge node, and packets sent via each of those virtual interfaces can be routed via respective unicast LSPs (e.g., a different unicast LSP can be used for each virtual interface).

Multicast protocol module 30 implements a multicast protocol, such as PIM. Multicast protocol module is configured to update multicast forwarding and routing information (e.g., as maintained in multicast state information 22) based on multicast protocol messages exchanged with other nodes. Multicast protocol module 30 is also configured to generate and send multicast protocol messages as needed. It is noted that multiple multicast protocol modules can be included within control module 20 if edge node 12 implements more than one instance of a multicast protocol.

Multicast state information 22 includes routing information and forwarding information for each multicast group that edge node 12 for which edge node 12 performs routing. Multicast routing information for a multicast group can include a source address (S), a group address (G), and reverse path forwarding (RPF) information identifying the interface within edge node 12 that properly receives multicast data packets addressed to multicast group G, as well as the RPF neighbor that properly forwards those multicast data packets to edge node 12. The RPF interface is the interface leading to the root of the multicast tree for group G (e.g., the root of the multicast tree can be the rendezvous point associated with group G). The storage for multicast routing information is, in one embodiment, implemented as a Multicast Routing Information Base (MRIB).

Forwarding information for a particular multicast group can include a source address (S), a group address (G), an incoming interface (IIF) list, and an outgoing interface (OIF) list. Forwarding module 32 uses the forwarding information in multicast state information 22 to forward multicast data packets addressed to multicast group G. For example, when a packet having destination address G is received, the forwarding module accesses the forwarding information for group G and verifies the source address and incoming interface (the RPF interface) of the packet. If the packet was received via an interface other than the one identified in the IIF list, the packet is dropped. If the receiving interface matches the forwarding information in multicast state information 22, the packet is forwarded from the interfaces listed in the OIF list. The storage for multicast forwarding information is, in one embodiment, implemented as a Multicast Forwarding Information Base (MFIB).

Forwarding module 32 is configured to forward packets towards a destination address based on information, such as a source and destination address, included within the header of each packet as well as forwarding information maintained within edge node 12. Forwarding module 32 is configured to forward both unicast and multicast packets. The multicast forwarding information generated by multicast protocol module 30 is used by forwarding module 32 when forwarding packets having multicast destination addresses.

When a virtual interface is created for a particular multicast group, virtual interface creation module 28 can add that virtual interface to multicast state information 22 associated with the particular multicast group. For example, in an egress node, when a virtual interface is created for a multicast group, the IIF list in the multicast forwarding information is updated to identify the virtual interface. Similarly, in an ingress node, when a virtual interface is created for a multicast group, the OIF list for that multicast group is updated to include the virtual interface.

Packet rewrite module 34 is configured to detect when a packet has been sent to a virtual interface and to rewrite such packets for transmission via an appropriate physical interface. When operating in an egress node, packet rewrite module 34 examines a packet being sent via a virtual interface in order to identify the source address. Packet rewrite module 34 then uses the source address to identify the appropriate next hop node (e.g., an ingress node on the other side of the core network) to which the packet should be forwarded. Packet rewrite module 34 then generates a label, which identifies the appropriate label switched path (LSP) to use to reach the next hop node, and attaches the label to the packet. If, for example, the packet is a multicast protocol message and the border gateway protocol (BGP) next-hop address associated with the multicast group identified in the message is an IPV4-mapped-IPV6 address, packet rewrite module 34 can extract the IPV4 address and use that address to identify the corresponding interior gateway protocol (IGP) label, which identifies the appropriate LSP. After rewriting a packet, packet rewrite module 34 causes the packet to be output from the physical interface (e.g., interface 26) that is coupled to the core network.

If the core network uses a different addressing scheme than the edge nodes, packet rewrite module 34 can also rewrite the source address of the encapsulated packet to the appropriate address scheme. For example, if the core network does not support IPV6, packet rewrite module 34 can replace the source address of the packet with the IPV4-mapped-IPV6 address of edge node 12. Additionally, packet rewrite module 34 can include another intermediate label (after the label identifying the LSP) identifying that the encapsulated packet is an IPV6 packet. The destination address of a multicast protocol message is still default multicast destination address (e.g., for IPV6 implementations, FF02::D), and thus does not need to be rewritten.

Packet rewrite module 34 also rewrites multicast protocol messages that are received via a physical interface that is not enabled for multicast and/or the addressing scheme in use within edge node 12. In particular, when a multicast protocol message is received from a core network via such a physical interface, packet rewrite module 34 will use the source address of the message to select the appropriate virtual interface (as created by virtual interface creation module 28). Packet rewrite module 34 will then rewrite the incoming interface of the multicast protocol message to the virtual interface. Accordingly, the virtual interfaces are bidirectional and can be used to both send and receive multicast and/or multicast protocol messages.

If edge node 12 is an egress node, edge node 12 will need to perform an RPF check on incoming multicast data packets to verify that those data packets are received via the interface on which the corresponding PIM join was output. If the RPF check for a packet is successful, the packet is forwarded; otherwise, the packet is dropped. The RPF check is performed by looking up the source address of the packet in the forwarding information (within multicast state information 22) to determine whether the packet arrived via the RPF interface. In this scenario, the virtual interface is the RPF interface identified in the forwarding information.

In order to ensure that multicast data packets pass the RPF check, the egress node assigns an RPF label to each ingress node (the RPF label can identify the virtual interface associated with that ingress node) reachable via a non-multicast-enabled core network. Packet rewrite module 34 includes a new field in multicast protocol messages that stores the RPF label. When the ingress node receives multicast protocol messages that include the RPF label field, the ingress node extracts and stores the RPF label. Whenever the ingress node sends multicast packets (either data packets or control messages) to the egress node via a virtual interface, the packet rewrite module 34 obtains the corresponding RPF label and adds this label as a second label (after the IGP label identifying the LSP) to the encapsulated multicast packet. The packet rewrite module 34 within the egress node will remove this second label and rewrite the incoming interface of the multicast packet to the virtual interface associated with the RPF label (in some embodiments, the RPF label directly identifies the virtual interface). As a result, the incoming multicast packets will pass the RPF check, since the incoming interface will match the RPF interface identified in the multicast forwarding information.

Figure 3:
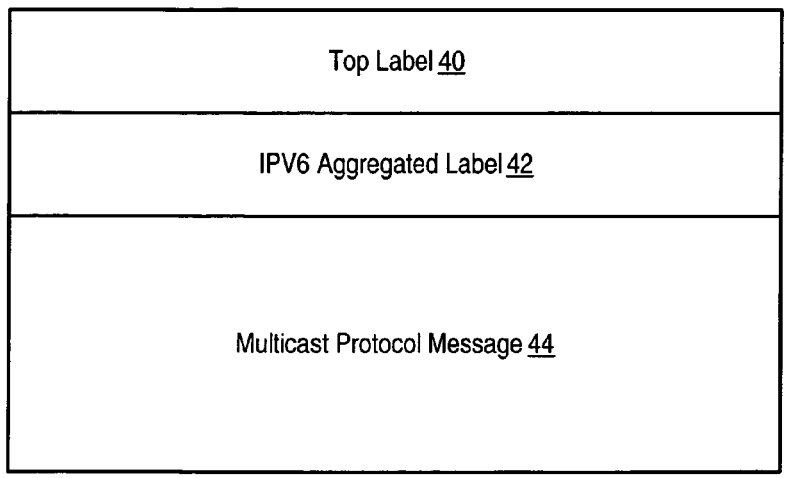
FIG. 3 shows an example of a packet that encapsulates a multicast protocol message for transmission over a non-multicast enabled core network, according to one embodiment of the present invention.

FIG. 3 shows an example of a packet that encapsulates a multicast protocol message for transmission over a non-multicast enabled core network. As shown, the packet includes a multicast protocol message 44, an IPV6 aggregated label 42, and a top label 40.

The multicast protocol message 44 is a control message that conforms to a multicast protocol such as PIM. The multicast protocol message can be, for example, a Hello message, a Join message, or a Prune message. The multicast protocol message is sent to the default IPV6 multicast destination address (FF02::D). In embodiments in which the core network does not support IPV6 but the edge nodes do, the source address of the multicast protocol message is the sending node's IPV4-mapped-IPV6 address.

In some embodiments, multicast protocol message 44 also includes an RPF label field (not shown). When a multicast protocol message is being sent from an egress edge node to an ingress edge node, the RPF label field is set to a value identifying the virtual interface (within the egress edge node) that is associated with the ingress edge node.

IPV6 aggregated label 42 is included in embodiments in which the core network does not support IPV6 but the edge nodes do support IPV6. IPV6 aggregated label 42 includes information identifying that the encapsulated packet is an IPV6 packet. This causes the packet to be handled by IPV6 processing within the receiving edge node (this IPV6 processing functionality will also remove IPV6 aggregated label 42). The IPV6 processing functionality will forward the packet to the correct process that handles multicast protocol packets.

Top label 40 is a label used in label switched routing. Top label 40 identifies a unicast LSP between the sending edge node and the receiving edge node. Intermediate core nodes use top label 40 to determine how to forward the packet. Each intermediate core node can rewrite top label 40 based on information in an internal forwarding information base (FIB). Top label 40 is removed by the receiving edge node.

Figure 4:
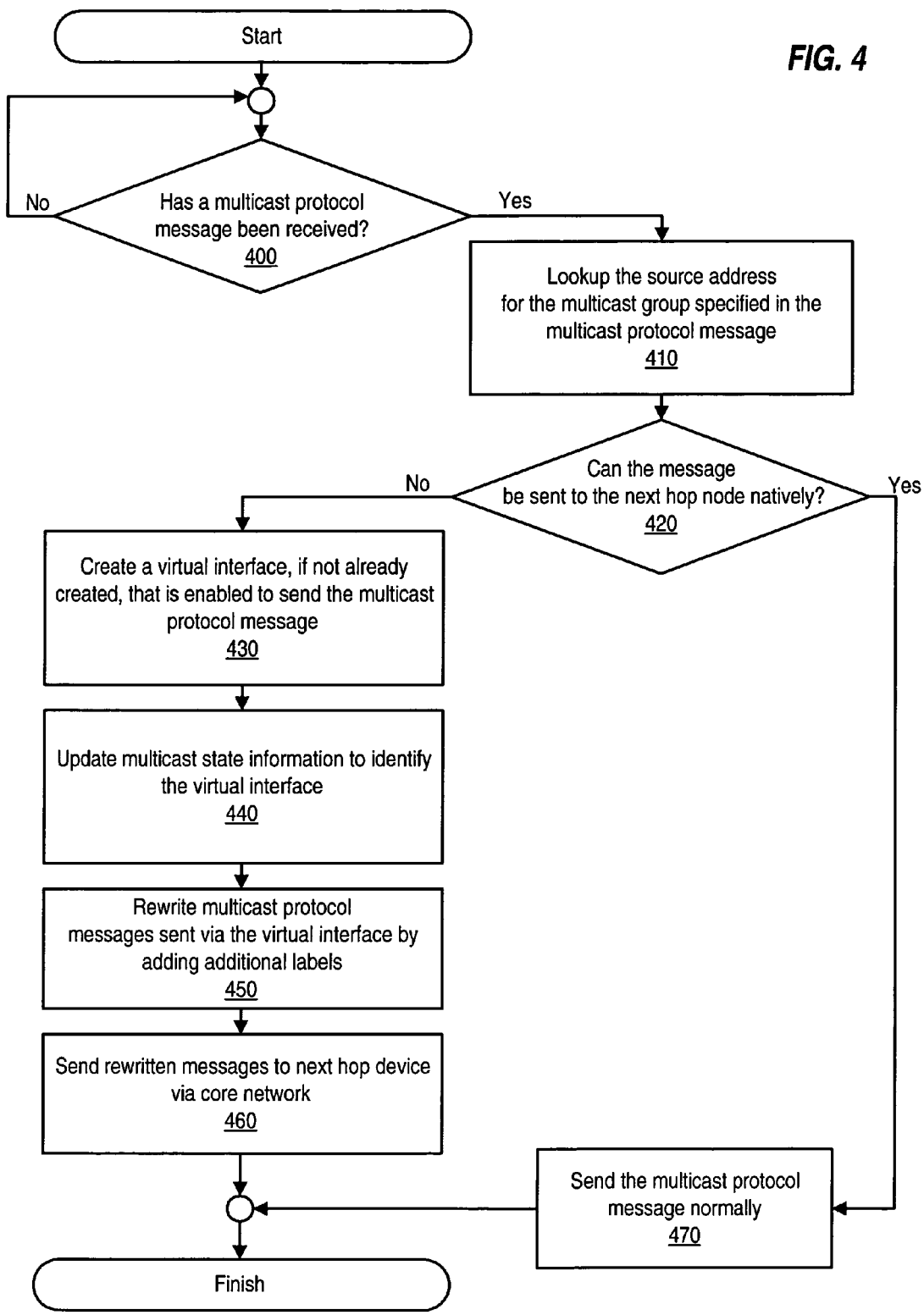
FIG. 4 is a flowchart of one embodiment of a method of processing a multicast protocol message to be sent via a non-multicast enabled core network.

FIG. 4 is a flowchart of one embodiment of a method of processing a multicast protocol message to be sent via a non-multicast enabled core network. This method can be performed by an egress node, such as egress node 12(1) of FIG. 1.

The method begins at 400, when the egress node determines whether a multicast protocol message (e.g., a join or prune message) has been received that needs to be forwarded towards the root of the multicast distribution tree for the specified multicast group. If so, the egress node looks up the source address for the multicast group specified in the multicast protocol message, as shown at 410. Based on the results of the source address lookup, the egress node determines whether the multicast protocol message can be sent to the next hop node natively, as shown at 420.

If the multicast protocol message can be sent to the next hop node natively (e.g., if the next hop node is coupled to the egress node by a network that is enabled for multicast and that uses the same addressing scheme as the egress node), the multicast protocol message is forwarded normally, as shown at 470.

Otherwise, the egress node is coupled to the ingress node by a core network that is not enabled for multicast and/or does not use the same addressing scheme as the ingress and egress nodes. In this situation, the egress node creates a virtual interface, if one has not already been created, that corresponds to the next hop node, as shown at 430. The virtual interface is enabled for multicast and for the same addressing scheme as the egress node. However, the virtual interface is not physically connected to any network and cannot actually output packets.

At 440, the egress node updates its multicast state information to identify the virtual interface. In particular, the egress node updates its multicast forwarding information for the multicast group to identify the virtual interface as the incoming interface (the RPF interface). The egress node begins sending multicast protocol hello messages via the virtual interface as soon as the virtual interface is enabled for multicast.

The egress node then rewrites any multicast protocol messages that are sent via the virtual interface, as shown at 450. In particular, the egress node adds one or more labels (e.g., the top label and IPV6 aggregated labels shown in FIG. 3) to the multicast protocol message. These labels can include a label identifying a unicast LSP, which is used by a core network that implements label switched routing, as well as a label identifying an address scheme (e.g., IPV6). The egress node can also rewrite the source address of the multicast protocol message in a form that is recognized by the addressing scheme in use by the core network, if needed. Additionally, the egress node can add a field to the multicast protocol message to store an RPF label, as described above. The rewritten message can be sent via a physical interface that is not enabled for multicast. At 460, the egress node sends the rewritten message to the next hop node via the core network.

Figure 5:
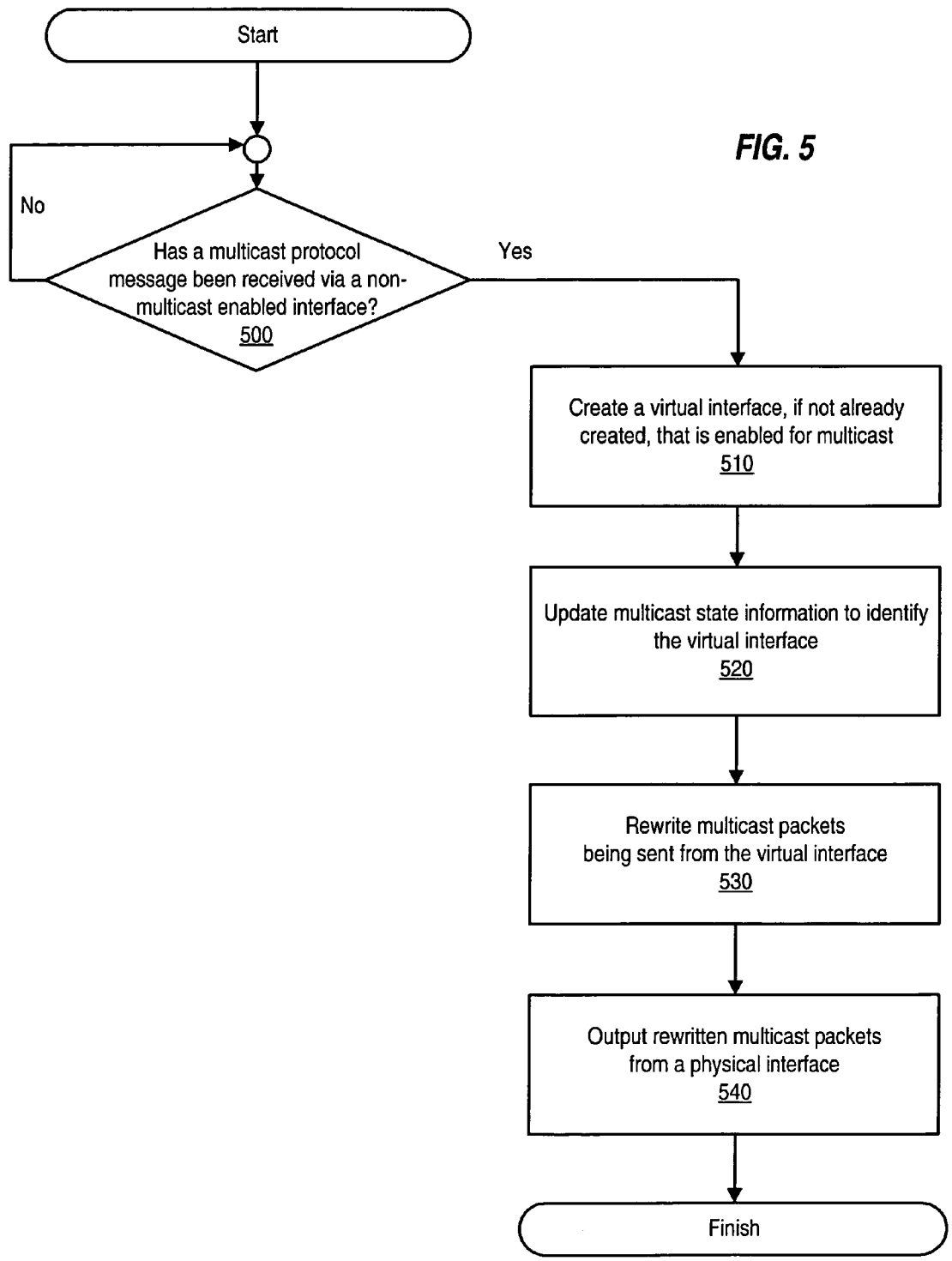
FIG. 5 is a flowchart of one embodiment of a method of processing a multicast protocol message received via a non-multicast enabled core network.

FIG. 5 is a flowchart of one embodiment of a method of processing a multicast protocol message received via a non-multicast enabled core network. This method can be performed by an ingress node, such as ingress node 12(2) of FIG. 1.

The method of FIG. 5 begins at 500, when the ingress node determines whether a multicast protocol message has been received via a non-multicast-enabled physical interface. If not, the multicast protocol message is processed normally.

If the multicast protocol message is received via a non-multicast-enabled physical interface, the ingress node creates a virtual interface, if one has not already been created, that corresponds to the egress node from which the message was sent, as shown at 510. The virtual interface is enabled for multicast. Additionally, if the core network coupling the ingress and egress nodes is not enabled for the same addressing scheme as the edge nodes, the virtual interface will be enabled for the particular addressing scheme used by the edge nodes. If the multicast protocol message includes an RPF label field, the ingress node will extract the RPF label from the multicast protocol message for later use.

The ingress node then updates its multicast state information to identify the virtual interface, as shown at 520. In particular, the ingress node adds the virtual interface to the OIF list included within the multicast forwarding information for the multicast group.

The ingress node will then rewrite multicast packets (both multicast protocol messages and multicast data packets) that are output via the virtual interface, as shown at 530. In particular, the ingress node will add a top level label, which identifies a unicast LSP, to the multicast packets. The ingress node can also add an RPF label to multicast packets that are output via the virtual interface. The ingress node then outputs the rewritten multicast packets from a physical interface, which is not enabled for multicast, that is coupled to the core network, as shown at 540.

Figure 6:
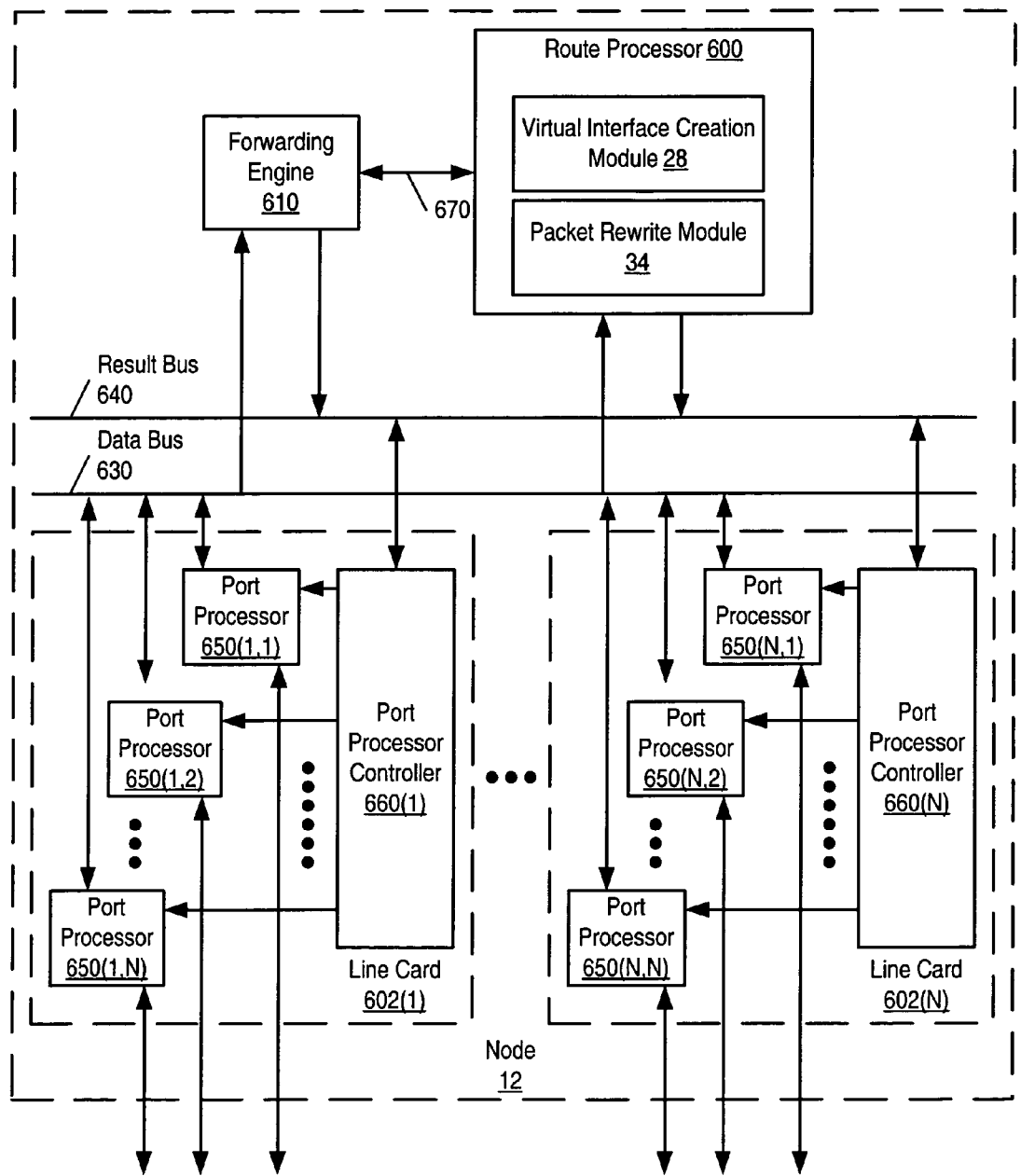
FIG. 6 is a block diagram of a network device, according to one embodiment of the present invention.

FIG. 6 is a block diagram of a node 12 (e.g., one of network devices 16(1)-16(4) of FIG. 1). In this depiction, node 12 includes a number of line cards (line cards 602(1)-602(N)) that are communicatively coupled to a forwarding engine 610 and a route processor 600 via a data bus 730 and a result bus 740. Route processor 600 can implement one or more instances of a multicast routing protocol and/or one or more instances of a unicast routing protocol. Route processor 600 includes a virtual interface creation module 28 (e.g., as shown in FIG. 2) and a message rewrite module 34 (e.g., as shown in FIG. 2).

Line cards 602(1)-602(N) include a number of port processors 650(1,1)-650(N,N) which are controlled by port processor controllers 660(1)-660(N). It will also be noted that forwarding engine 610 and route processor 600 are not only coupled to one another via data bus 630 and result bus 640, but are also communicatively coupled to one another by a communications link 670. It is noted that in alternative embodiments, each line card can include a forwarding engine.

When a packet is received, the packet is identified and analyzed by a network device such as node 12 in the following manner, according to embodiments of the present invention. Upon receipt, a packet (or some or all of its control information) is sent from the one of port processors 650(1,1)-650(N,N) at which the packet was received to one or more of those devices coupled to data bus 630 (e.g., others of port processors 650(1,1)-650(N,N), forwarding engine 610 and/or route processor 600). Handling of the packet can be determined, for example, by forwarding engine 610. For example, forwarding engine 610 may determine that the packet should be forwarded to one or more of port processors 650(1,1)-650(N,N). This can be accomplished by indicating to corresponding one(s) of port processor controllers 660(1)-660(N) that the copy of the packet held in the given one(s) of port processors 650(1,1)-650(N,N) should be forwarded to the appropriate one of port processors 650(1,1)-650(N,N).

Figure 7:
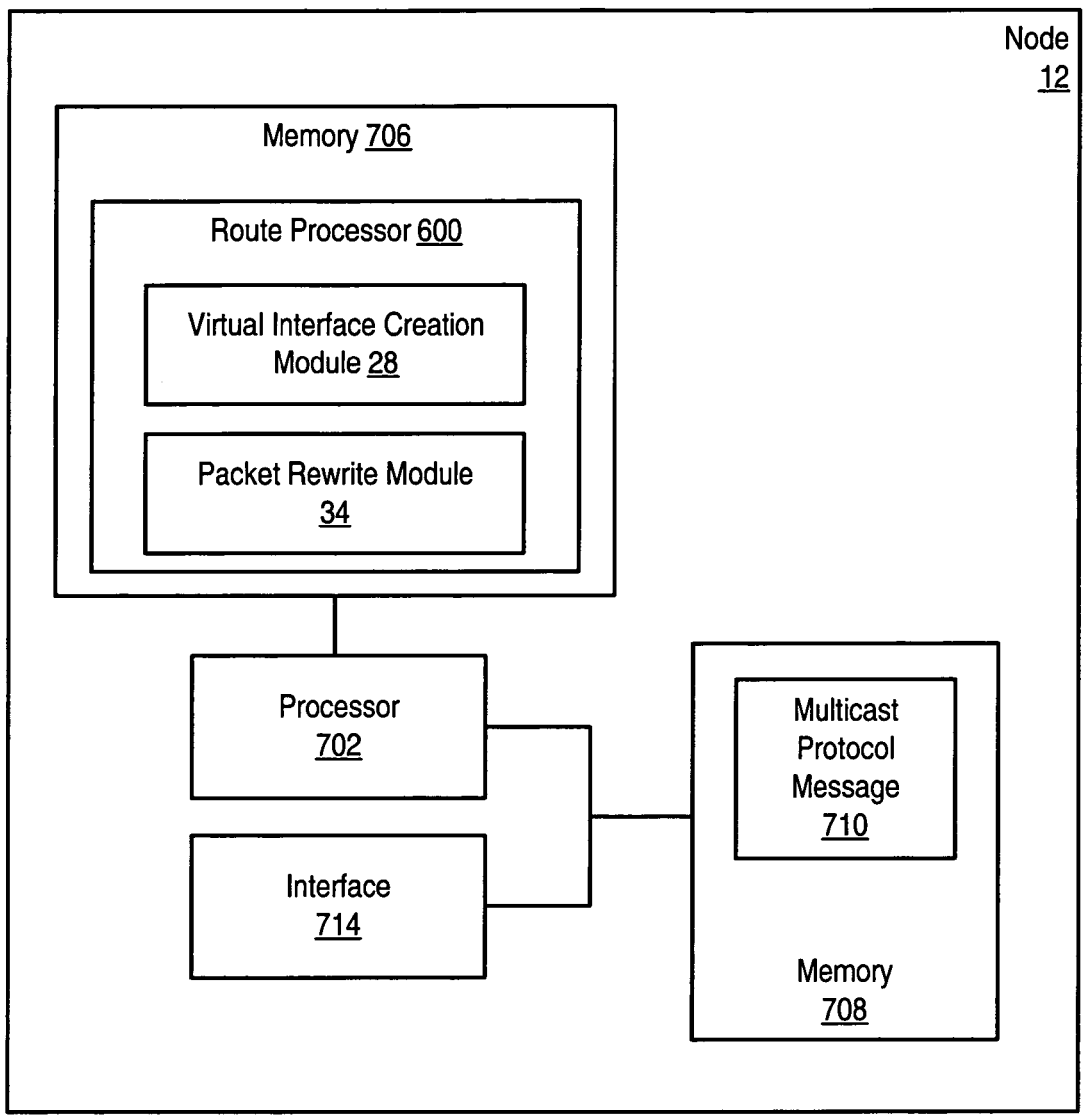
FIG. 7 is another block diagram of a network device, according to one embodiment of the present invention.

FIG. 7 illustrates a block diagram of a node 12, which illustrates how at least a portion of route processor 600 (as shown in FIG. 6) can be implemented in software. As illustrated, node 12 includes one or more processors 702 (e.g., microprocessors, PLDs (Programmable Logic Devices), or ASICs (Application Specific Integrated Circuits)) configured to execute program instructions stored in memory 706. Memory 706 can include various types of RAM (Random Access Memory), ROM (Read Only Memory), Flash memory, MEMS (Micro Electro-Mechanical Systems) memory, and the like. Processor 702, memory 706, and interface 714 are coupled to send and receive data and control signals by a bus or other interconnect. Packets, such as multicast protocol message 710, received via interface 714 can be stored in memory 708 for processing by route processor 600.

In this example, program instructions executable to implement route processor 600, including virtual interface creation module 28 and packet rewrite module 34, are stored in memory 706. Additionally, multicast state information (e.g., as shown in FIG. 2) can also be stored in memory 706 for use by route processor 600. The program instructions and data implementing route processor 600 can be stored on various computer readable media such as memory 706. In some embodiments, route processor 600 software is stored on a computer readable medium such as a CD (Compact Disc), DVD (Digital Versatile Disc), hard disk, optical disk, tape device, floppy disk, and the like). In order to be executed by processor 702, the instructions and data implementing route processor 600 are loaded into memory 706 from the other computer readable medium. The instructions and/or data implementing route processor 600 can also be transferred to node 12 for storage in memory 706 via a network such as the Internet or upon a carrier medium. In some embodiments, a computer readable medium is a carrier medium such as a network and/or a wireless link upon which signals such as electrical, electromagnetic, or digital signals, on which the data and instructions implementing route processor 600 are encoded, are conveyed.

For purposes of this disclosure, a "packet" may include a cell, datagram, frame, segment, or any other logical group of information that is conveyed via a network. Network devices perform switching and routing functions in order to convey packets from a source to a destination along a path.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   creating a virtual interface on an edge node, in response to receiving a multicast protocol message, wherein
      the multicast protocol message is received from or to be sent to a non-multicast-enabled network,
      the creating the virtual interface comprises updating interface information with a virtual interface data structure comprising an address of the virtual interface,
      the virtual interface data structure does not comprise any information identifying any physical interface;
      the interface information further comprises a plurality of physical interface data structures comprising addresses of physical interfaces of the edge node, and
      the physical interface data structures do not comprise the address of the virtual interface;
   encapsulating a multicast packet with a first label, wherein
      the multicast packet is encapsulated with the first label in response to detecting that the multicast packet is being sent via the virtual interface, and
      the first label identifies a unicast label switched path (LSP);
   outputting the encapsulated multicast packet via a physical interface coupled to the non-multicast-enabled network, wherein the physical interface is not enabled for multicast.

2. The method of claim 1, further comprising:
   in response to the creating the virtual interface, updating multicast state information for a multicast group to identify the virtual interface, wherein
      the multicast protocol message identifies the multicast group.

3. The method of claim 2, wherein the physical interface is enabled for a first addressing scheme and the virtual interface is enabled for a second addressing scheme.

4. The method of claim 3, further comprising:
   adding a second label to the encapsulated multicast packet prior to outputting the encapsulated multicast packet via the physical interface, wherein
      the second label identifies the second addressing scheme.

5. The method of claim 3, further comprising:
   rewriting a source address of the encapsulated multicast packet prior to outputting the encapsulated multicast packet via the physical interface, wherein
      the rewritten source address conforms to the first addressing scheme.

6. The method of claim 2, wherein
   the creating the virtual interface is performed in response to detecting that a next hop node for the multicast group is reachable via the non-multicast-enabled network.

7. The method of claim 2, wherein
the creating the virtual interface is performed in response to receiving the multicast protocol message in encapsulated form from the non-multicast-enabled network via a non-multicast-enabled physical interface of the edge node.

8. The method of claim 2, further comprising:
adding a reverse path forwarding (RPF) label field to the encapsulated multicast packet prior to outputting the encapsulated multicast packet, wherein
the edge node comprises an egress edge node,
the RPF label field stores an RPF label identifying the virtual interface created on the egress edge node, and
the encapsulated multicast packet comprises the multicast protocol message being sent from the egress edge node to an ingress edge node via the non-multicast-enabled network.

9. The method of claim 2, further comprising:
adding a second label to the encapsulated multicast packet prior to outputting the encapsulated multicast packet, wherein
the edge node comprises an ingress edge node, and
the second label comprises a reverse path forwarding (RPF) label received from an egress edge node.

10. The method of claim 8, wherein
the multicast state information comprises forwarding information,
the virtual interface is added to an incoming interface list of the forwarding information, and
the incoming interface list is associated with the multicast group.

11. The method of claim 9, wherein
the multicast state information comprises forwarding information,
the virtual interface is added to an outgoing interface list of the forwarding information, and
the outgoing interface list is associated with the multicast group.

12. The method of claim 10, further comprising:
performing an RPF check on a second multicast packet comprising a second RPF label received at the egress edge node via the physical interface, wherein
a source address of the second multicast packet is used to look up an expected RPF interface for the second multicast packet in the forwarding information,
the RPF label identifies an incoming interface of the second multicast packet to be the virtual interface created on the egress edge node, and
the second multicast packet passes the RPF check when the expected RPF interface matches the virtual interface.

13. An edge node comprising:
a physical interface configured to be coupled to a core network, wherein
the physical interface is not enabled for multicast, and
the core network is not enabled for multicast;
a virtual interface creation module coupled to the physical interface, wherein
the virtual interface creation module is configured to:
create a virtual interface on the edge node in response to receiving a multicast protocol message, wherein
the virtual interface is created by updating interface information with a virtual interface data structure comprising an address of the virtual interface,
the multicast protocol message is received from or to be sent to the core network,
the virtual interface data structure does not comprise any information identifying any physical interface;
the interface information further comprises a plurality of physical interface data structures comprising addresses of physical interfaces of the edge node, and
the physical interface data structures do not comprise the address of the virtual interface; and
a packet rewrite module coupled to the physical interface, wherein
the packet rewrite module is configured to:
encapsulate a multicast packet with a first label in response to detecting that the multicast packet is being sent via the virtual interface; and
send the encapsulated multicast packet to the physical interface, wherein
the first label identifies a unicast label switched path (LSP) through the core network.

14. The edge node of claim 13, wherein
the virtual interface creation module is coupled to the packet rewrite module, and
the virtual interface is enabled for multicast.

15. The edge node of claim 14, wherein
the physical interface is enabled for a first addressing scheme and the virtual interface is enabled for a second addressing scheme,
the packet rewrite module is configured to:
add a second label to the multicast packet, wherein the second label identifies the second addressing scheme; and
rewrite a source address of the multicast packet, wherein the rewritten source address conforms to the first addressing scheme.

16. The edge node of claim 14, wherein the virtual interface creation module is configured to create the virtual interface in response to one of:
detection that a next hop node for a multicast group is reachable via the core network, wherein
the multicast protocol message identifies the multicast group; and
reception of the multicast protocol message in encapsulated form from the core network via a non-multicast-enabled physical interface of the edge node.

17. The edge node of claim 14, wherein
the packet rewrite module is configured to add a reverse path forwarding (RPF) label field to the multicast packet,
the edge node comprises an egress edge node,
the RPF label field stores an RPF label identifying the virtual interface created on the egress edge node, and
the multicast packet comprises the multicast protocol message being sent from the egress edge node to an ingress edge node via the core network.

18. The edge node of claim 14, wherein
the packet rewrite module is configured to add a second label to the multicast packet,
the edge node comprises an ingress edge node, and
the second label comprises a reverse path forwarding (RPF) label received from an egress edge node.

19. A system comprising:
means for creating a virtual interface on an edge node, in response to receipt of a multicast protocol message, wherein
the means for creating comprises means for updating interface information with a virtual interface data structure comprising an address of the virtual interface, the multicast protocol message is received from or to be sent to a non-multicast-enabled network, the virtual interface data structure does not comprise any information identifying any physical interface;

the interface information further comprises a plurality of physical interface data structures comprising addresses of physical interfaces of the edge node, and the physical interface data structures do not comprise the address of the virtual interface;

means for encapsulating a multicast packet with a label, wherein the multicast packet is encapsulated with the label in response to a detection of the multicast packet being sent via the virtual interface, and the label identifies a unicast label switched path (LSP); and means for outputting the encapsulated multicast packet via a physical interface coupled to the non-multicast-enabled network.

* * * * *